US012798883B2

(12) United States Patent
Diebel

(10) Patent No.: US 12,798,883 B2
(45) Date of Patent: Nov. 17, 2026

(54) HINGED BELT CONVEYOR HAVING A PROTECTIVE SHIELD

(71) Applicant: Kabelschlepp GmbH—Hünsborn, Wenden-Hünsborn (DE)

(72) Inventor: Michael Diebel, Dillenburg (DE)

(73) Assignee: Kabelschlepp GmbH—Hünsborn, Wenden-Hünsborn (DE)

( * ) Notice: Subject to any disclaimer, the term of this patent is extended or adjusted under 35 U.S.C. 154(b) by 2 days.

(21) Appl. No.: 19/131,814

(22) PCT Filed: Nov. 3, 2023

(86) PCT No.: PCT/EP2023/080735

§ 371 (c)(1),
(2) Date: May 21, 2025

(87) PCT Pub. No.: WO2024/110174

PCT Pub. Date: May 30, 2024

(65) Prior Publication Data

US 2026/0193039 A1 Jul. 9, 2026

(30) Foreign Application Priority Data

Nov. 21, 2022 (DE) ..................... 10 2022 130 757.3

(51) Int. Cl.

*B65G 17/06* (2006.01)
*B65G 17/08* (2006.01)
*B65G 17/38* (2006.01)

(52) U.S. Cl.

CPC ........... *B65G 17/067* (2013.01); *B65G 17/38* (2013.01)

(58) Field of Classification Search

CPC ...... B65G 17/06; B65G 17/067; B65G 17/08; B65G 17/38

(Continued)

(56) References Cited

U.S. PATENT DOCUMENTS 5,219,065 A * 6/1993 Hodlewsky .......... B65G 37/005 198/853
5,921,378 A * 7/1999 Bonnet .................. B65G 17/08 198/850

(Continued)

FOREIGN PATENT DOCUMENTS

DE 3101209 A1 10/1982
EP 1857383 A2 11/2007

(Continued)

OTHER PUBLICATIONS

Tsubaki Kabelschlepp Gmbh; "Innovative Solutions for the Machine Tool Industry," https://t3.lappcdn.com/fileadmin/DAM/Miltronic_Sweden/4_Servicecenter/2_Nedladdningscenter/Kabelschlepp_Innovations-for-machine-tool-industry.pdf, XP093123442, Mar. 22, 2019, pp. 1-28.

(Continued)

*Primary Examiner* — Douglas A Hess
(74) *Attorney, Agent, or Firm* — BainwoodHuang

(57) ABSTRACT

A hinged belt conveyor has an endless hinged belt formed by links. Each link has a lower plate and an upper plate. The lower plates are articulated to one another. In the hinged belt conveyor, the lower plate and the upper plate of the link are arranged at a distance from one another. The upper plates form an outer surface, which forms a substantially gap-free upper side of the hinged belt. The expression "substantially gap-free" in this context means that overlapping regions of two adjacent upper plates are movable relative to one another. For example, chips drop on this side of the hinged belt and are then transported away. The upper plate of a link is connected to the lower plate in such a way that the upper plate is displaceable parallel to the lower plate and perpendicularly in a longitudinal direction of the hinged belt.

9 Claims, 2 Drawing Sheets

Figure 1:
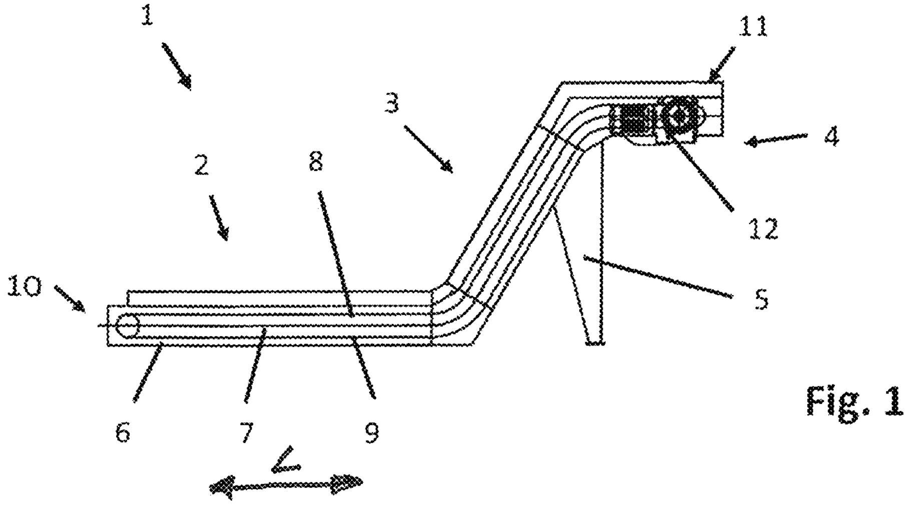

(58) Field of Classification Search
USPC .............................. 198/844.1, 850, 851, 853
See application file for complete search history.

(56) References Cited

U.S. PATENT DOCUMENTS

| | | | | |
|---|---|---|---|---|
| 6,736,259 | B1 * | 5/2004 | Funabashi | B65G 17/086 198/852 |
| 6,871,736 | B2 * | 3/2005 | Fandella | B65G 17/086 198/853 |
| 6,945,388 | B2 * | 9/2005 | Schumacher | B65G 17/065 198/851 |
| 7,500,555 | B1 * | 3/2009 | Liao | B65G 17/10 198/852 |
| 7,703,600 | B1 * | 4/2010 | Price | F16G 3/02 198/844.2 |
| 9,139,370 | B1 * | 9/2015 | Massey, Jr. | B65G 23/06 |
| 9,394,112 | B2 * | 7/2016 | Andreoli | B65G 17/385 |
| 10,138,092 | B2 * | 11/2018 | Turek | B66B 23/10 |
| 11,332,315 | B2 * | 5/2022 | Andreoli | B65G 17/08 |
| 2003/0141172 | A1 * | 7/2003 | Arai et al. | |
| 2006/0157325 | A1 * | 7/2006 | Loutzenheiser | |

FOREIGN PATENT DOCUMENTS

| | | | | |
|---|---|---|---|---|
| WO | WO-2012068699 A1 * | 5/2012 | | B65G 17/06 |
| WO | WO-2020058506 A1 * | 3/2020 | | B65G 17/08 |

OTHER PUBLICATIONS

Tsubaki Kabelschlepp Gmbh; "Wave-Belt Conveyors," https://tsubaki-kabelschlepp.com/en-int/products/conveyor-systems/wave-belt-conveyors/, Sep. 30, 2022, XP093123451, pp. 1-7.

* cited by examiner

HINGED BELT CONVEYOR HAVING A PROTECTIVE SHIELD

The subject matter of the invention relates to a hinged belt conveyor, preferably for metal waste, such as chips or the like.

Hinged belt conveyors for metal waste, such as chips or the like, are known. They are used for metal-working machines in order to convey metal waste, such as chips or the like, to a collecting container. A hinged belt conveyor has an endless hinged belt, which is connected to an actuating device. The hinged belt is formed by links, which are connected to one another in an articulated fashion. The links are formed at least partially by plates consisting of wear-resistant steel plates. Such an embodiment of a hinged plate conveyor is known from DE 31 01 209A1, for example. The hinged belt comprises individual hinges, arranged offset with respect to one another, and plates, which are held together in an articulated manner by pins inserted into the hinges. A hinged belt conveyor can have a housing of channel-type design, on the side walls of which guide rails for the upper and lower runs of the articulated belt are fastened.

Hinged belt conveyors are also used, in particular, to feed semi-finished goods in the form, for example, of sheet-metal parts, to the machine tools. A hinged belt conveyor can also be used to carry away the parts or blanks processed by the machine tool. This is the case, for example, with laser cutting machines. In the case of such laser cutting machines, the high processing speed gives rise to the problem that in some cases parts leaving the laser cutting machine have a very high temperature when the parts are discharged onto hinged belt conveyors. If a hinged belt conveyor is arranged below a laser cutting head, there is the risk that the laser beam will strike the links of the endless hinged belt conveyor, possibly leading to damage to the hinged belt.

A hinged belt conveyor may have a considerable width. Thus it is known, for example, that the links may have a length of more than 2000 mm transversely to the conveying direction of the hinged belt.

Given this situation, it is the underlying object of the invention to specify a hinged belt conveyor having an endless hinged belt, the operational reliability of which is enhanced, particularly in connection with laser machine tools.

This object is achieved by means of a hinged belt conveyor having features disclosed herein. Advantageous embodiments and developments are specified herein. The features presented individually can be combined in any technologically feasible manner and may be supplemented as disclosed within the description, indicating additional variant embodiments of the invention.

The hinged belt conveyor according to the invention has an endless hinged belt and an actuating device connected to the hinged belt. The actuating device is suitable and intended for achieving a movement of the endless hinged belt. The actuating device can have a motor, in particular an electric motor, which is connected directly or indirectly to the hinged belt.

The hinged belt is formed by links. Each link has a lower plate and an upper plate. The lower plates are connected to one another in an articulated manner. In the case of the hinged belt conveyor according to the invention, the lower plate and the upper plate are arranged at a distance from one another. The upper plates form an outer surface which forms a substantially gap-free upper side of the hinged belt. In this context, substantially gap-free means that overlapping regions of two adjacent upper plates are movable relative to one another. It is on this side of the hinged belt that, for example, chips fall, which are then carried away.

The upper plate of a link is connected to the lower plate in such a way that the upper plate is movable parallel to the lower plate and perpendicularly in a longitudinal direction of the hinged belt.

The design according to the invention ensures that thermal loading of the hinged belt, e.g. due to the action of a laser beam, leads to essentially no deformation of the hinged belt. The substantially gap-free upper side of the hinged belt is preserved. By virtue of the fact that the upper plate of a link is connected movably to the lower plate, the upper plate has the possibility of expanding when subject to thermal loading, and therefore a change in the length of the upper plate due to thermal expansion does not lead to deformation of the link.

To simplify assembly and provide defined holding of the hinged belt during actuation of the hinged belt conveyor, it is proposed that an end region of the upper plate of a link is connected firmly to the lower plate of the link. In such an embodiment, it is possible to state that an end region of the upper plate forms a fixed bearing with the lower plate, wherein the other end region of the upper plate forms a floating bearing with the lower plate, such that the upper plate is in a certain sense mounted in a floating manner.

To simplify assembly and simplify the exchange of an upper plate, the proposal according to another embodiment of the hinged belt is that the upper plate of the link has a slotted hole which extends perpendicularly to a longitudinal direction of the hinged belt and through which a fastening means connecting the upper plate and the lower plate extends.

Depending on the embodiment of the lower plates, which are connected to one another in an articulated manner, it may be advantageous to provide a spacer between the lower plate and the upper plate of a link. The spacer is used to set the distance between the lower plate and the upper plate. The spacer can also be used to compensate for any manufacturing tolerances in order to ensure that the upper plates form a substantially gap-free upper side of the hinged belt.

If a spacer is provided, it is advantageous if the fastening means extends through the spacer. Thus, the assembly effort and the required number of components to obtain the hinged belt are reduced. Moreover, this also ensures that no additional aids are required to fix the spacer.

In order to achieve a sufficiently high stability transversely to the longitudinal direction of the hinged belt, the proposal according to another advantageous embodiment of the hinged belt conveyor is that the lower plate of a link is of profiled design in cross section. An embodiment in which the lower plate is of U-shaped design is particularly preferred.

Yet another advantageous embodiment of the hinged belt conveyor according to the invention can be seen in that the upper plate of a link has lugs, which are supported on the lower plate of the link, ensuring that the link has a high bending stiffness.

Particularly when the hinged belt conveyor is used in combination with a laser machine tool, the upper plate is preferably designed in such a way that it is laser-resistant. Laser resistance can preferably be achieved by the fact that the surface of the upper plate has a high reflectance or allows high scatter of the laser light. The upper plate of a link can also be formed from a material with a high specific heat capacity.

This embodiment of the hinged belt conveyor also has the advantage that the upper plate can be exchanged when required, this being associated with high convenience for servicing.

Further advantages and details of the invention are described with reference to the figures illustrated in the drawing.

Figure 2:
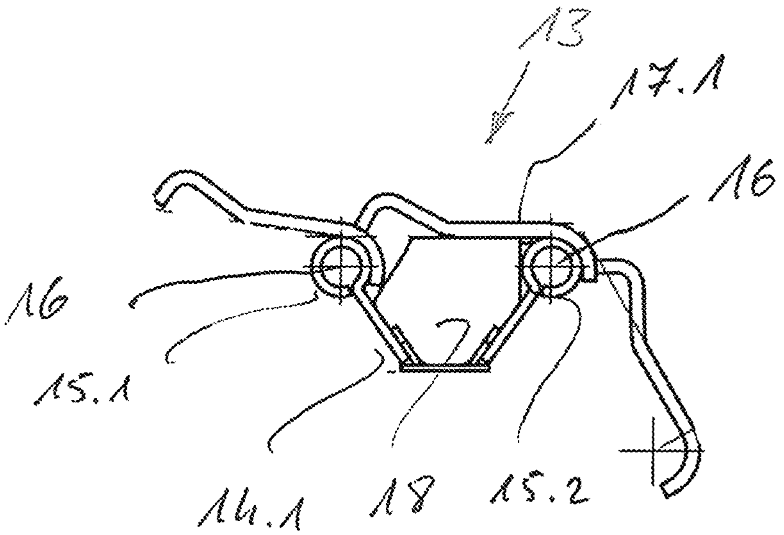
Figure 3:
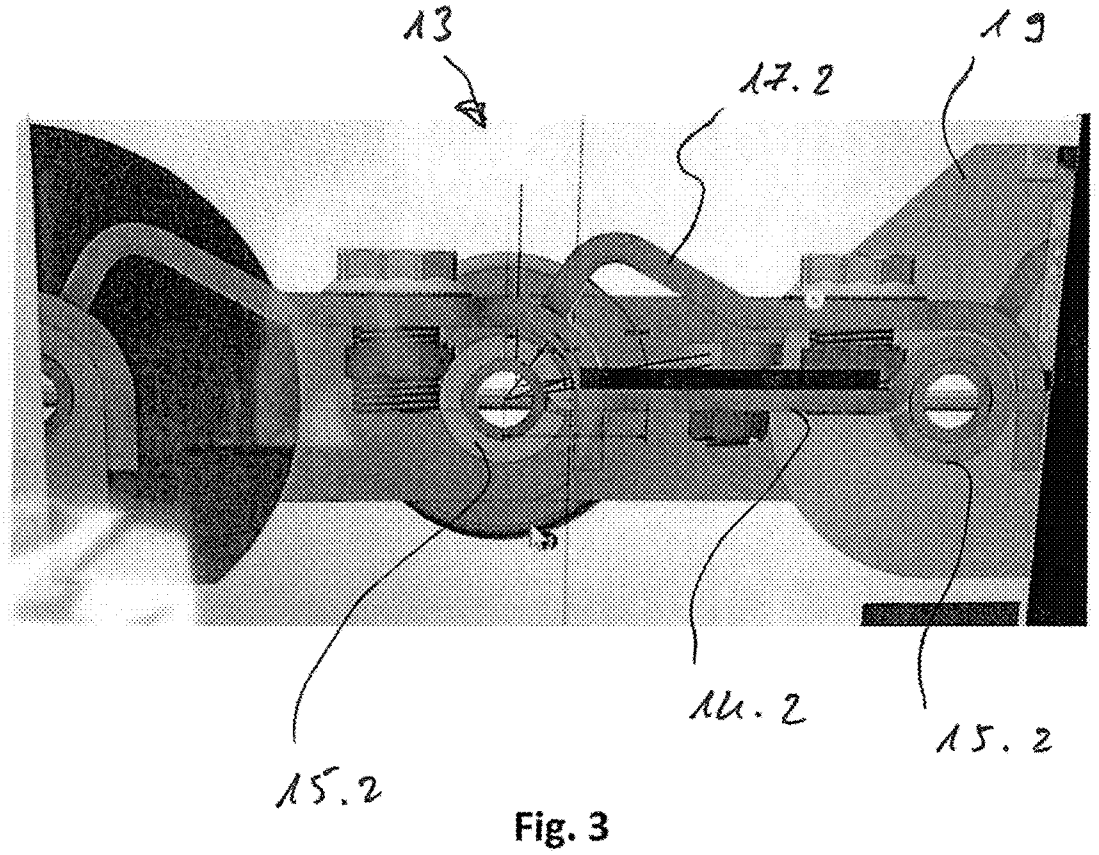
Figure 4:
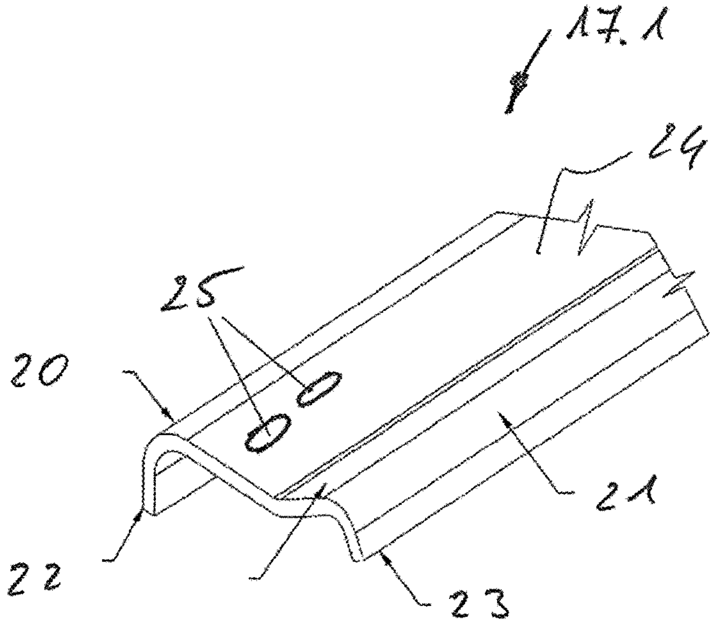

In the drawings:

FIG. 1: schematically shows one exemplary embodiment of a hinged belt conveyor, FIG. 2: shows a detail of the first exemplary embodiment of a hinged belt, FIG. 3: shows a detail of a second exemplary embodiment of a hinged belt, and FIG. 4: shows one embodiment of an upper plate.

FIG. 1 schematically shows a hinged belt conveyor 1 in elevation. In the exemplary embodiment illustrated, the hinged belt conveyor 1 has a substantially horizontal feed region 2. The feed region 2 merges into a sloping region 3. In the exemplary embodiment illustrated, the sloping region 3 merges into a substantially horizontal discharge region 4. The sloping region 3 and the discharge region 4 are held by a stand 5.

An endless hinged belt 7 is arranged within a housing 6 of the hinged belt conveyor 1. The hinged belt 7 has an upper run 8 with an upper side and a lower run 9. Reference sign 10 denotes a first return region in the feed region 2. A second return region 11 is provided in the discharge region 4. An actuating device 12 is arranged in return region 11. The actuating device 12 preferably comprises an electric motor, which is connected directly or indirectly to a drive wheel for driving the hinged belt. The design of the hinged belt conveyor 1 illustrated in FIG. 1 is illustrative. Thus, the hinged belt conveyor can modify a straight design into a straight and a sloping design.

FIG. 2 illustrates a first exemplary embodiment of the fundamental construction of a hinged belt 7. FIG. 2 shows only a detail of a hinged belt.

The hinged belt is formed by links 13. The links 13 are connected to one another in an articulated manner. From the illustration according to FIG. 2, it can be seen that the link 13 has a lower plate 14.1. The lower plate 14.1 of the link 13 is of substantially U-shaped design.

The lower plate 14.1 has hinge eyes 15.1, 15.2. The hinge eyes 15.1, 15.2 are formed on the longitudinal rims of the lower plate 14.1. The longitudinal rims of the lower plates 14.1 extend transversely to the transport direction of the hinged belt conveyor.

In the exemplary embodiment illustrated, the lower plate 14.1 comprises a plurality of hinge eyes 15.1 arranged at a distance from one another. A plurality of hinge eyes 15.2 is provided on the opposite longitudinal rim of the lower plate 14.1. The hinge eyes 15.1, 15.2 are arranged offset with respect to one another, and therefore the hinge eyes 15.1, 15.2 alternate with one another when two adjacent lower plates 14.1 are connected.

Extending through the hinge eyes are pins 16, which each form a spindle for the links to enable the links to be deflected. The pins 16 are connected to an endless chain (not illustrated), for example. The endless chain is actuated by the actuating device 12, thus enabling circulating operation of the endless belt.

From the illustration according to FIG. 2, it can be seen that the lower plate 14.1 has a substantially U-shaped cross section. High intrinsic stability of the lower plate is thereby achieved.

An upper plate 17.1 is connected to the lower plate 14.1. The connection of the upper plate 17.1 to the lower plate 14.1 is such that the upper plate 17.1 of the link 13.1 is connected to the lower plate 14.1 in a manner which allows it to be moved parallel to the lower plate 14.1 and perpendicularly to a longitudinal direction L of the hinged belt 1.

The connection can be configured in such a way that the upper plate 17.1 has at least one slotted hole which extends in the longitudinal direction of the upper plate 17.1. Extending through the slotted hole there is, for example, a pin, which is connected to the lower plate. On its portion protruding from the upper plate, the pin can have a thread, and therefore a connection between the lower plate 14.1 and the upper plate 17.1 is achieved by means of a nut. The tightening torque of the screw is chosen so that the upper plate has a certain play.

From the exemplary embodiment illustrated in FIG. 2, it can be seen that the upper plate 17.1 has at least one lug 18, which is connected to the upper plate 17.1. The geometry of the lug 18 is chosen so that the edges of the lug are supported on the walls of the U-shaped lower plate 14.1.

Another exemplary embodiment of a hinged belt can be seen from FIG. 3, which illustrates a detail of a hinged belt.

The basic structure of the hinged belt corresponds to the structure of the hinged belt according to FIG. 2.

In this exemplary embodiment too, a link 13 is formed by a lower plate 14.2 and an upper plate 17.2. In the exemplary embodiment illustrated, the lower plate 14.2 is of substantially straight design. The lower plate 14.2 has hinge eyes, through which pins 16 extend. In the exemplary embodiment illustrated, the spindles are additionally connected to the lateral flanges 19.

FIG. 3 shows that the upper plate 17.2 is screwed to the lower plate 14.2. In the exemplary embodiment illustrated, the lower plate 14.1 has an additional layer 19.

FIG. 4 shows an upper plate 17.1 in a perspective view. The upper plate 17.1 has a first longitudinal region 20. The first longitudinal region 20 extends in the longitudinal direction of a first longitudinal rim 22. The first longitudinal region 20 is of curved design. The curvature of the longitudinal regions is preferably produced by rolling.

It can furthermore be seen from FIG. 4 that the upper plate 17.1 has a second longitudinal region 21. The second longitudinal region 21 extends in the longitudinal region of a second longitudinal rim 23. The second longitudinal region 21 is of curved design.

The curved longitudinal regions 20, 21 are designed in such a way that the first longitudinal region 20 overlaps the second longitudinal region 21 of an adjacent plate. In this case, the first longitudinal rim 22 preferably rests on an upper side 24 and serves as a scraper during the movement of the hinged belt conveyor. The curvature of the upper side of the second longitudinal region preferably corresponds to the curvature of the inner side of the first longitudinal region. However, this is not absolutely essential. It is sufficient if the curvature of the upper side of the second longitudinal region 22 is less than the curvature of the first longitudinal region 2.

From the illustration according to FIG. 4, it can be seen that the plate 1 has two slotted holes 25, which are used to pass through screws.

During the operation of the hinged belt conveyor, hot waste gets onto the upper plates of the links. Particularly in the case of machine tools that operate with a laser, there is the risk that the laser will come into contact with the upper plate. As a result of this, heat may be introduced into the upper plate. The expansion and cooling of the upper plate and the associated change in the length of the upper plate transversely to the longitudinal direction of the hinged belt is made possible by the type of connection between the upper plate and the lower plate, ensuring that there is no deformation of the upper plate. In view of the fact that no permanent deformation of the upper plate occurs, a long service life of the hinged belt conveyor is achieved since the substantially gap-free upper side of the hinged belt is preserved.

LIST OF REFERENCE SIGNS

1 hinged belt conveyor
2 feed region
3 sloping region
4 discharge region
5 stand
6 housing
7 hinged belt
8 upper run
9 lower run
10 return region
11 return region
12 actuating device
13 links
14.1, 14.2 lower plate
15.1, 15.2 hinge eye
16 pin
17.1 upper plate
18 lug
19 lateral flange
20 first longitudinal region
21 second longitudinal region
22 first longitudinal rim
23 second longitudinal rim
24 upper side
25 slotted hole

The invention claimed is:

1. Hinged belt conveyor having
an endless hinged belt and
an actuating device connected to the hinged belt,
wherein the hinged belt is formed by links, wherein each link has a lower plate and an upper plate, wherein the lower plates are connected to one another in an articulated manner, wherein the lower plate and the upper plate are arranged at a distance from one another, wherein the upper plates form a gap-free upper side of the hinged belt, wherein the upper plate of a link is connected to the lower plate in a manner which allows it to be moved parallel to the lower plate and perpendicularly to a longitudinal direction of the hinged belt.

2. Hinged belt conveyor according to claim 1, wherein an end region of the upper plate of a link is connected firmly to the lower plate of the link.

3. Hinged belt conveyor according to claim 2, wherein the upper plate of the link has a slotted hole which extends perpendicularly to a longitudinal direction (L) of the hinged belt and through which a fastening means connecting the upper plate and the lower plate extends.

4. Hinged belt conveyor according to claim 3, wherein a spacer is provided between the lower plate and the upper plate of a link.

5. Hinged belt conveyor according to claim 4, wherein the fastening means extends through the spacer.

6. Hinged belt conveyor according to claim 1, wherein the lower plate of a link is profiled in cross section.

7. Hinged belt conveyor according to claim 1, wherein the lower plate of a link is of U-shaped design.

8. Hinged belt conveyor according to claim 1, wherein the upper plate of a link has lugs, which are supported on the lower plate of the link.

9. Hinged belt conveyor according to claim 1, wherein a spacer is provided between the lower plate and the upper plate of a link.

* * * * *